UNITED STATES PATENT OFFICE 2,069,802

CELLULOSIC STRUCTURES

Winfield Walter Heckert, Ardentown, and Wesley Rasmus Peterson, Carrcroft, Del., assignors, by mesne assignments, to E. I. du Pont de Nemours & Company, Wilmington, Del., a corporation of Delaware No Drawing. Application April 16, 1934, Serial No. 720,802

12 Claims. (Cl. 106—40)

This invention relates to artificial cellulosic structures, such as filaments, threads, fabrics, sheets, films, caps, tubing or the like. More particularly, this invention relates to cellulosic structures of the type just mentioned characterized by a subdued or low luster and/or being more or less opaque.

In the ordinary methods of preparing cellulosic structures, such as filaments, threads, films, caps, tubing, etc., from viscose, cuprammonium, nitrocellulose, cellulose acetate and other cellulosic solutions (without the addition of opaquing and/or low luster-inducing agents to the solution), the products are transparent or translucent and/or very highly lustrous. For many purposes, transparency, brilliant sheen and luster are not desirable and thus restrict the uses of the material.

We have found that we can produce artificial cellulosic structures of the type above mentioned and characterized by a subdued or low luster and/or being more or less opaque by incorporating therein an organic substance of the type more fully explained hereafter.

The nature and objects of the invention will become apparent from the following description and appended claims.

In accordance with the principles of the instant invention, there is provided artificial cellulosic structures, such as filaments, threads, films, caps, tubing or the like, having subdued or low lusters and/or being more or less opaque. These desiderata are secured, according to one phase of the invention, by incorporating in the solution from which the structure is to be produced a low luster-inducing agent of the type hereafter more fully explained.

The low luster-inducing agent contemplated by the instant invention is a polynuclear heterocyclic organic substance in which the hetero-atom or atoms are selected from Group VI, Sub-Group B of the periodic table, that is oxygen, sulphur, selenium and tellurium. One or more or all of the nuclei may be heterocyclic, and preferably 5 or 6 membered rings containing one or more hetero-atoms, and the remaining nuclei, if any, being carbocyclic rings, and preferably aromatic rings which may be attached by a single valence or condensed to the heterocyclic nucleus. Especially suitable are those compounds of the above-mentioned type which contain a sufficient number of carbocyclic or heterocyclic nuclei highly deficient in hydrogen and having a refractive index differing by at least 0.1, such as 0.15, 0.2, 0.3, 0.4, or indeed more, from the mean index of refraction of the substance constituting the mass of the cellulosic structure. Though heterocyclic compounds of the type herein referred to having one or two nuclei highly deficient in hydrogen may produce low luster products, much better results are secured when the heterocyclic compounds contain at least three nuclei highly deficient in hydrogen. The preferred compounds are white, or substantially white, crystalline solids having melting points substantially above ordinary temperatures and preferably above 100° C. So far as this invention is concerned, each closed chain of carbon or hetero-atoms or combination of carbon and hetero-atoms shall be considered as a nucleus. Thus, benzene, naphthalene and thianthrene have one, two and three nuclei respectively.

The specific low luster-inducing agents contemplated by the instant invention belong to the class which consists of condensed or non-condensed aromatic heterocyclic substances having present at least two, and preferably three or more, nuclei highly deficient in hydrogen in which the hetero-atom or atoms belong to the group consisting of oxygen, sulphur, selenium and tellurium, and in which the heterocyclic nuclei are selected from the group consisting of pyrane and the sulphur, selenium and tellurium analogues and in which the aromatic nuclei are benzene, diphenyl or naphthalene nuclei, and the substantially white derivatives of these compounds, such as simple substitution products in which hydrogen is replaced by halogen, an alkyl group, a hydroxy alkyl group or a carbocyclic or heterocyclic nucleus.

As illustrative examples of compounds of the above-mentioned type which have given satisfactory results may be mentioned the following:

Polynuclear derivatives of pyrane
    Dinaphthoxanthene
    Methyl dinaphthoxanthene
    Phenyl dinaphthoxanthene
    9-phenyl xanthene
    Naphthopyrane
    Benzo-naphthoxanthene
    Bis-dinaphthoxanthene
    Bis-dinaphthoxanthylene
    Xanthene
    Propyl dinaphthoxanthene
    Isopropyl dinaphthoxanthene
    Thioxanthene
    Penthiophene-bis-thiophene The refractive index of a preferred specific compound is as follows:
    Methyl dinaphthoxanthene (at least 2 principal indices, approximately 1.62 and above 1.78).

The mean refractive index of rayon produced by the viscose process is usually considered to be 1.535 (1.52 and 1.55) and the index of refraction of cellulose acetate rayon is 1.48.

The aforementioned low luster-inducing agents, which are white in color, possess a sufficiently low vapor pressure and are sufficiently inert to resist change or removal from the structure in the ordinary process of making and finishing the same during the manufacture thereof. They also effectively resist removal or change during any of the usual processes to which the finished structure may be subjected, such as boiling off, dyeing, bleaching, ironing, etc. The substances are incompatible with the mass of the substance constituting the final product. Substances may be used which are soluble in the cellulosic solution, but sufficiently incompatible with the cellulosic material to produce an opacifying and delustering effect in the final product.

The low luster-inducing agent may be added to the cellulosic solution at any stage in the course of the preparation of the solution prior to the actual spinning or casting. It may be added directly, if the particle size is satisfactory, or after suitable adjustment of the particle size by any of the well-known methods, such as grinding in a colloid mill or pebble mill or in the form of a suspension or emulsion prepared with or without the assistance of suitable dispersing agents or protective colloids, such as soaps, sulphonated oils, alkyl naphthalene sulphonic acid salts (Nekal), sodium caseinate, etc. or combinations thereof. The low luster-inducing agent may be completely insoluble in the solution or it may be soluble therein. If desired, when a soluble agent is used, it may be dissolved in one or all of the solvents previous to the preparation of the cellulosic solution. Likewise, it may be incorporated in the solution simultaneously with the cellulose derivative.

The quantity of low luster-inducing agents which may be used may vary within wide limits, depending principally upon the opaquing and the luster desired in the final product. Cellulosic structures containing these low luster and/or opaquing agents in amounts ranging from 0.1% to 15% by weight have given satisfactory results. It is obvious, of course, that smaller or larger quantities may be employed as desired. When a viscose solution is employed, satisfactory results may be secured if it contains 7% cellulose and from 0.01% to 1.5% more or less of the low luster-inducing agent and/or opaquing agent.

The low luster-inducing agents contemplated by the instant invention may be used in combination with each other and/or with other low luster-inducing agents, such as mineral oil, petroleum jelly, waxes, paraffins, benzene, toluene, pine oil, and other organic liquids, or inorganic pigments, such as titanium dioxide, lithopone, zinc sulphide, etc.

In order to more fully explain the principles of this invention, the following illustrative example is given. It is to be understood that this example does not in any way restrict the invention but merely illustrates a specific and preferred embodiment which has given satisfactory results.

*Example.*—20 pounds of methyl-dinaphthoxanthene are ground in a colloid mill with 40 pounds of water and 0.4 pounds of sodium caseinate until most of the particles are below 1 micron in diameter. The slurry is diluted with 5 parts of water and allowed to settle for 18 hours at a depth of 5 inches. The top 4 inches of liquid are carefully decanted and are found to contain very few particles above 4 microns in diameter, most of the particles being 1 micron in diameter or below. This suspension is analyzed (4–5 per cent) and used in making up viscose from the xanthate and sodium hydroxide. Enough suspension is employed to yield a final viscose solution containing 7% cellulose, 6% NaOH and 0.3% methyl dinaphthoxanthene. The methyl dinapthoxanthene is thoroughly incorporated and distributed throughout the viscose during the mixing operation. The viscose is filtered, ripened and spun or cast in the usual way. The product resulting after purification (desulphuring and bleaching), washing and drying has a permanent and desirable dull luster that is much lower than could be produced by an equivalent weight of mineral oil. Instead of pure methyl dinaphthoxanthene, a mixture resulting from the condensation of paraldehyde with beta-naphthol and comprising chiefly methyl dinaphthoxanthene and dinaphthyl acetal may be used. Satisfactory results were secured when the mixture contained about 20% dinaphthyl acetal and about 80% of methyl dinaphthoxanthene. If desired, this mixture (melting point at about 150° C.) may be emulsified by suitable mechanical treatment.

Though the preferred embodiments of this invention contemplate the incorporation of the low luster-inducing agent in the solution, at some time prior to extrusion or casting thereof, satisfactory results may be secured also by applying the low luster-inducing agent to a previously formed cellulosic structure. In other words, the low luster-inducing agent may be incorporated in the final cellulosic structure by an after treatment.

Though the invention has been specifically described in connection with the viscose process, it is obvious that the principles thereof are equally applicable to the cellulose acetate, cuprammonium and cellulose nitrate processes.

Since it is obvious that various changes may be made in the specific details hereinabove set forth, this invention is not restricted thereto except as set forth in the appended claims.

We claim:

1. An artificial cellulosic structure having a low or subdued luster imparted thereto by the incorporation therein of an incompatible aromatic heterocyclic organic compound having at least two nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

2. An artificial cellulosic structure having a low or subdued luster imparted thereto by the incorporation therein of an incompatible aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy, alkyl group, a carbocyclic or heterocyclic nucleus.

3. An artificial cellulosic structure having a low or subdued luster imparted thereto by the incorporation therein of an incompatible condensed aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

4. An artificial cellulosic structure having a low or subdued luster imparted thereto by the incorporation therein of an incompatible non-condensed aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

5. An artificial cellulosic structure characterized by a low or subdued luster and containing methyl dinaphthoxanthene in an amount to impart a low or subdued luster.

6. An artificial cellulosic structure characterized by a low or subdued luster and containing methyl dinaphthoxanthene and dinaphthyl acetal in an amount to impart a low or subdued luster.

7. Artificial silk filaments formed of regenerated cellulose having a low or subdued luster and containing an aromatic heterocyclic organic compound having at least two nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

8. Artificial silk filaments formed of regenerated cellulose having a low or subdued luster imparted thereto by the incorporation therein of an incompatible aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

9. Artificial silk filaments formed of regenerated cellulose having a low or subdued luster imparted thereto by the incorporation therein of an incompatible condensed aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

10. Artificial silk filaments formed of regenerated cellulose having a low or subdued luster imparted thereto by the incorporation therein of an incompatible non-condensed aromatic heterocyclic organic compound having three or more nuclei highly deficient in hydrogen and in which a heterocyclic nucleus is of the class which consists of pyrane, the sulphur, selenium and tellurium analogues thereof, and the substantially white derivatives thereof secured when hydrogen is replaced by halogen, an alkyl group, a hydroxy alkyl group, a carbocyclic or heterocyclic nucleus.

11. Artificial silk filaments formed of regenerated cellulose having a low or subdued luster and containing methyl dinaphthoxanthene in an amount to impart a low or subdued luster.

12. Artificial silk filaments formed of regenerated cellulose having a low or subdued luster and containing methyl dinaphthoxanthene and dinaphthyl acetal in an amount to impart a low or subdued luster.

WINFIELD WALTER HECKERT.
WESLEY RASMUS PETERSON.